United States Patent
Utsumi et al.

(10) Patent No.: US 12,289,184 B2
(45) Date of Patent: Apr. 29, 2025

(54) ESTIMATION SYSTEM AND ESTIMATION METHOD

(71) Applicant: HITACHI, LTD., Tokyo (JP)

(72) Inventors: Masato Utsumi, Tokyo (JP); Tohru Watanabe, Tokyo (JP); Kazuki Namba, Tokyo (JP); Ikuo Shigemori, Tokyo (JP); Hiroshi Iimura, Tokyo (JP); Hiroaki Ogawa, Tokyo (JP); Daisuke Hamaba, Tokyo (JP); Jun Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/278,062

(22) PCT Filed: Mar. 8, 2022

(86) PCT No.: PCT/JP2022/010049
§ 371 (c)(1),
(2) Date: Aug. 21, 2023

(87) PCT Pub. No.: WO2022/244400
PCT Pub. Date: Nov. 24, 2022

(65) Prior Publication Data
US 2024/0146580 A1    May 2, 2024

(30) Foreign Application Priority Data
May 19, 2021   (JP) ................. 2021-084480

(51) Int. Cl.
*H04L 25/02* (2006.01)
*G06F 18/241* (2023.01)

(52) U.S. Cl.
CPC ........ *H04L 25/0202* (2013.01); *G06F 18/241* (2023.01)

(58) Field of Classification Search
CPC .... H04L 25/0202; G16Y 10/35; G16Y 20/30; G16Y 40/20; Y04S 10/50; G06Q 10/04; G06Q 50/06; G06F 18/241; G06N 20/00
See application file for complete search history.

(56) References Cited

U.S. PATENT DOCUMENTS

2013/0226358 A1* 8/2013 Rudkevich ............. H02J 3/06
                                                     700/286
2018/0173171 A1* 6/2018 Lin ........................ H02J 3/06
(Continued)

FOREIGN PATENT DOCUMENTS

JP   2006331229 A   12/2006
JP   2009048235 A    3/2009

OTHER PUBLICATIONS

International Search Report of PCT/JP2022/010049 dated May 17, 2022.

*Primary Examiner* — David S Huang
(74) *Attorney, Agent, or Firm* — MATTINGLY & MALUR, PC

(57) ABSTRACT

An estimation system generates, from a value of a time series of an estimation object in a past period, a plurality of patterns of a transition of a value of the estimation object. Based on the plurality of generated patterns and a value of a time series of a factor in the past period, the estimation system specifies a dependency relationship between a transition pattern and a value of the factor and a transition pattern at a past (or future) time point and identifies a model in accordance with the specified dependency relationship. By inputting a value of a time series of the factor in a future period to the estimation model, the estimation system specifies a time series of a value in the future period of the estimation object using at least one transition pattern.

7 Claims, 9 Drawing Sheets

(56) References Cited

U.S. PATENT DOCUMENTS

| | | | |
|---|---|---|---|
| 2019/0147551 A1* | 5/2019 | Sun | H02J 3/008 |
| | | | 700/291 |
| 2022/0097817 A1* | 3/2022 | Perry | F02D 19/0647 |

* cited by examiner

COMPARATIVE EXAMPLE

ESTIMATION SYSTEM AND ESTIMATION METHOD

TECHNICAL FIELD

The present invention generally relates to an estimation system and an estimation method and is suitably applied to, for example, an estimation system for calculating a future physical quantity or an index value related to electric power.

BACKGROUND ART

In an energy business field including electric power businesses and gas businesses, a communication business field, a transportation business field including taxis and delivery businesses, and the like, capacity utilization and resource allocation matching consumer demand are planned and executed based on estimates of various index values such as demand up to a predetermined time in the future.

For example, an electric power demand or an electric power transaction price are known to be affected by air temperature and, in this case, an estimation model of the electric power demand or the electric power transaction price is identified with outside air temperature as an explanatory variable (an example of the factor). Estimates up to a predetermined time in the future are output using the identified estimation model.

A method disclosed in PTL 1 includes receiving input of prediction model information from a user, carrying out a regression analysis based on a history of a crude oil FOB price and a history of a JCC price, accepting a designation of a period t to be an object of prediction, applying the period t to the prediction model, and calculating a predicted value of the JCC price in the period t.

A method disclosed in PTL 2 includes calculating a power generation cost by creating a power generation plan based on demand supposition data, power supply data, and market data, determining a bid volume and a bid price to an electric power market based on the power generation cost, and determining a transaction volume and a transaction price using an algorithm that takes a consignable volume of an interconnection line into consideration based on the bid volume and the bid price.

CITATION LIST

Patent Literature

[PTL 1] Japanese Patent Application Laid-open No. 2009-048235
[PTL 2] Japanese Patent Application Laid-open No. 2006-331229

SUMMARY OF INVENTION

Technical Problem

For example, there may be regions (for example, countries) or cases where securing fuel for a generator may require a relatively long future period (for example, a period in an order of months such as a few months) due to a period required to transport the fuel or other reasons. In addition, an electric power market price (transaction price) is managed in units of a relatively short time (for example, in an order of minutes such as 15 minutes or 30 minutes). Due to such reasons, making estimates (estimates of an electric power market price) in units of a relatively short time until an end of a relatively long future period is important.

Although PTL 1 discloses a method of calculating monthly estimates over a few months in the future using monthly crude oil FOB prices and monthly JCC prices, PTL 1 neither discloses nor suggests a method of calculating estimates in the units of a relatively short time. Although PTL 2 discloses a method of predicting an electric power market price using meteorological data, it is difficult to calculate a predicted value of weather over a future period such as a few months in the future with small deviation. Therefore, with the methods disclosed in PTL 1 and 2, it is difficult to estimate an electric power market price in units of a short period of time over a future period such as a few months in the future with high accuracy.

The problem described above also applies to estimation objects other an electric power market price.

Solution to Problem

An estimation system stores sample estimation object data, sample factor data, and estimation factor data. The sample estimation object data is data representing a value of a time series of an estimation object in a past period. The sample factor data is data including, for each of one or more factors defined to be potentially capable of affecting a value of the estimation object, a data set representing a value of a time series of the factor in the past period. The estimation factor data is data including, for each of the one or more factors, a data set representing a value of a time series of the factor in a future period. The estimation system generates, from the sample estimation object data, a plurality of estimation object transition patterns, each of which is a pattern of a transition of a value of the estimation object. Based on the sample factor data and the plurality of estimation object transition patterns, the estimation system specifies a pattern factor dependency relationship (a dependency relationship between an estimation object transition pattern and a value of one or more factors and an estimation object transition pattern at a past or future time point) and identifies an estimation model (a model which accepts a value of one or more factors and an estimation object transition pattern at a past or future time point as input and which produces an estimation object transition pattern as output) in accordance with the specified pattern factor dependency relationship. By inputting estimation factor data to the estimation model, the estimation system generates estimation result data that is data including one or more data sets representing a time series of a value in a future period of the estimation object using at least one of the plurality of estimation object transition patterns.

Advantageous Effects of Invention

According to the present invention, a value (value of an estimation object) can be estimated in units of a relatively short time (for example, 15 minutes or 30 minutes) over a relatively long future period (for example, a few months in the future).

DESCRIPTION OF EMBODIMENTS

Figure 1:
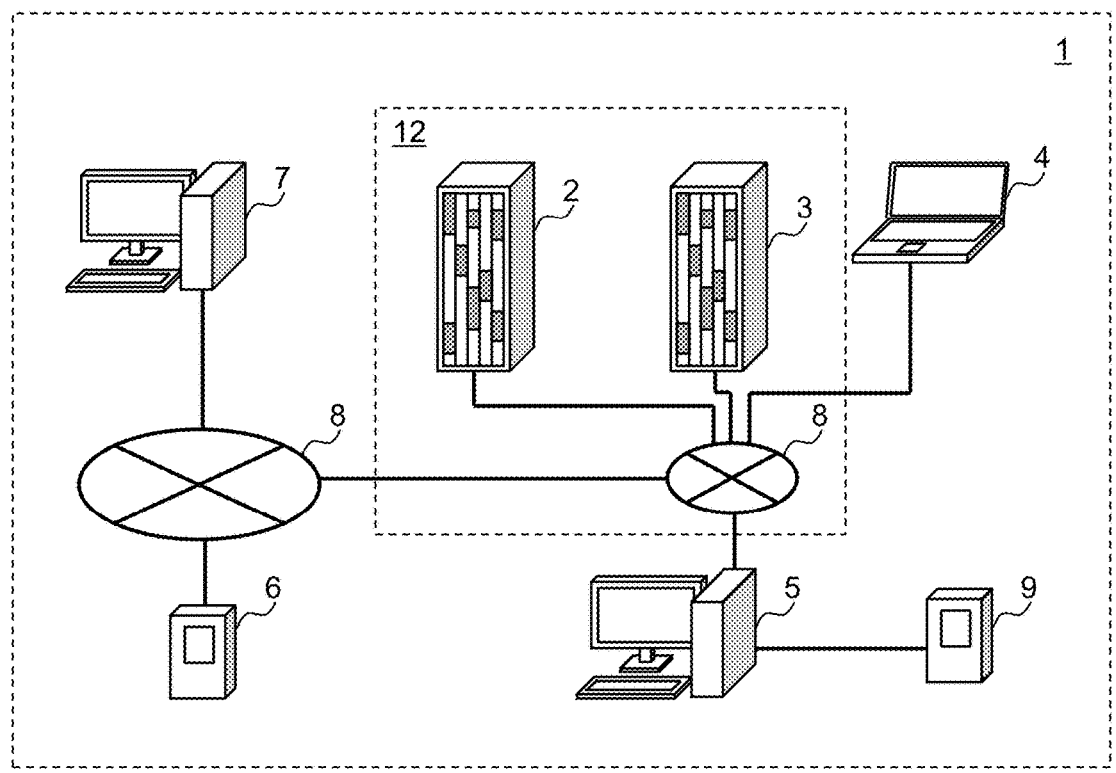
FIG. 1 is a diagram showing a configuration example of a data management system according to a first embodiment.

In the following description, an "interface apparatus" may be one or more interface devices. The one or more interface devices may be at least one of the following. One or more I/O (Input/Output) interface devices. An I/O (Input/Output) interface device is an interface device with respect to at least one of an I/O device and a remote display computer. An I/O interface device with respect to a display computer may be a communication interface device. The at least one I/O device may be any of a user interface device such as an input device including a keyboard and a pointing device and an output device such as a display device.

One or more communication interface devices. The one or more communication interface devices may be one or more communication interface devices of a same kind (for example, one or more NICs (Network Interface Cards)) or two or more communication interface devices of different kinds (for example, an NIC and an HBA (Host Bus Adapter)).

In addition, in the following description, a "memory" is one or more memory devices and may typically be a main storage device. The one or more memory devices in a memory may be volatile memory devices or non-volatile memory devices.

Furthermore, in the following description, a "persistent storage apparatus" is one or more persistent storage devices. A persistent storage device is, typically, a non-volatile storage device (for example, an auxiliary storage device) and may specifically be, for example, an HDD (Hard Disk Drive) or an SSD (Solid State Drive).

In addition, in the following description, a "storage apparatus" may be at least a memory among a memory and a persistent storage apparatus.

Furthermore, in the following description, a "processor" is one or more processor devices. While at least one processor device is typically a microprocessor device such as a CPU (Central Processing Unit), the processor device may be a processor device of a different kind such as a GPU (Graphics Processing Unit). The at least one processor device may be single-core or multi-core. The at least one processor device may be a processor core. The at least one processor device may be a processor device in a broad sense of the term such as a hardware circuit (for example, an FPGA (Field-Programmable Gate Array) or an ASIC (Application Specific Integrated Circuit)) which performs a part of or all of processing.

Furthermore, in the following description, while a function will be described using expressions such as a "yyy unit", a function may be realized when one or more computer programs are executed by a processor, may be realized by one or more hardware circuits (for example, an FPGA or an ASIC), or may be realized by a combination thereof. In a case where a function is realized when a program is executed by a processor, since prescribed processing is performed while using a storage apparatus and/or an interface apparatus or the like as appropriate, the function may be considered at least a part of the processor. Processing described using a function as a subject may be considered processing performed by a processor or an apparatus including the processor. A program may be installed from a program source. For example, the program source may be a program distribution computer or a computer-readable storage medium (for example, a non-transitory storage medium). The description of each function is merely an example and a plurality of functions may be consolidated into a single function or a single function may be divided into a plurality of functions.

In addition, in the following description, a "data set" is a block of logical electronic data as viewed from a program such as an application program and, for example, may be any of a record, a file, a key-value pair, a tuple, or the like.

Hereinafter, several embodiments of the present invention will be described in detail with reference to the drawings.

(1) First Embodiment (1-1) Configuration of Data Management System According to Present Embodiment In FIG. 1, reference numeral 1 denotes a data management system according to the present embodiment as a whole. For example, when applied to an electric power business field, the data management system 1 enables management of supply and demand of electric power including estimating values of demand for electric power, an amount of power generation, market price of electric power, and the like during a predetermined future period based on a past record of electric power demand, formulating and executing an operation plan of a generator based on the estimated results, and formulating and executing a plan for procurement and transaction of electric power from other electric power suppliers.

The data management system 1 is constituted of an estimation system 12 (for example, an estimation calculation apparatus 2 and a data management apparatus 3), a plan management apparatus 5, an information input/output terminal 4, a data observation apparatus 6, a data distribution apparatus 7, and a control object apparatus 9. In addition, a communication path 8 is a communication path which is a communication network such as a LAN (Local Area Network) or a WAN (Wide Area Network) and which couples the various apparatuses and terminals that constitute the data management system 1 so as to be capable of communicating with each other.

The data management apparatus 3 stores sample data of an estimation object and a factor to be used to calculate an estimate of an estimation object and estimation data of a factor.

The sample data of an estimation object may at least include sample estimation object data representing a time series of past observed values of the estimation object having been observed with the transition of time. In addition, the sample data of a factor may at least include sample factor data that is data including a data set representing a time series of past observed values of each of one or more factors defined to be potentially capable of affecting a value of the estimation object. Furthermore, the estimation data of a factor may at least include estimation data that is data including a data set representing a time series of values of each factor corresponding to a value included in the sample factor data.

For example, the estimation object may be energy consumption of electric power, gas, tap water, or the like, power generation output of energy such as photovoltaic power production or wind power generation, a transaction volume or a market price of energy traded at an electric power exchange, or the like. In addition, outside of the electric power business field, the estimation object may be a communication volume measured at a communication base station or the like, a positional information history of a mobile body such as an automobile, or the like. Furthermore, the pieces of sample data may be data per measuring instrument or data as a sum of a plurality of measuring instruments.

In addition, for example, the factor may be a weather-related item such as air temperature, humidity, an amount of solar radiation, wind speed, or atmospheric pressure, a fuel-related item such as a transaction volume, a market price, or the like of crude oil, natural gas, or the like, a power transmission line-related item such as a transmission capacity of the power transmission line, an item related to an operation of the generator or an operational status of the generator such as a maintenance schedule, a calendar-related item such as a date, a day of week, or a flag value indicating a type of an arbitrarily-set day, an item related to economic conditions such as a presence or absence of occurrence of an emergent event such as a typhoon or an event, the number of energy consumers, industry trends, or a business confidence index, an item related to a movement status of people or mobile bodies such as a rate of occupancy, the number of passengers, the number of reserved seats, or the like of express trains or road traffic conditions, or an item such as the number of communication terminals coupled to a communication base station. Furthermore, a part of factors may be the estimation object described above and, in such a case, a factor value may be a past observed value itself or an estimate itself at an estimation object time and date of the estimation object.

The data management apparatus 3 stores sample data from a past time and date set in advance to a latest observation time and date via the information input/output terminal 4. In addition, the data management apparatus 3 retrieves and transmits sample data in accordance with a data acquisition request from other apparatuses.

The estimation calculation apparatus 2 performs estimation using data stored in the data management apparatus 3. Details of the estimation calculation apparatus 2 will be provided later.

The plan management apparatus 5 creates and executes an operation plan of a physical facility (the control object apparatus 9) for achieving a predetermined goal based on the estimation result data output by the estimation calculation apparatus 2. The operation plan may include a determination of an amount of fuel to be procured for the physical facility or may include an operation plan of the physical facility. In this case, in the energy field, the operation plan of the physical facility may be an operation plan of the generator based on an estimated future energy demand value, a power generation output, or a market price. Specifically, the operation plan may be a plan including the number of started generators and output distribution of the generators or a distribution plan of a flow rate or pressure of gas or water to be fed through a gas conduit or a water pipe. Alternatively, in adjustment control of electric power demand called a demand response, the operation plan may be a plan of demand adjustment amount distribution of electric power consumers or a demand facility of the electric power consumers participating in the demand response. In addition, in the communication field, the operation plan may be a control plan of the number of communication terminals to be coupled to each communication base station so that, for example, an accommodation capacity of the communication base station is not exceeded. Furthermore, in the transportation field, the operation plan may be a dispatch plan of taxis capable of satisfying an estimated number of users.

Note that the operation plan of the facility is not limited to being directly executed by a subject who is to use the plan management apparatus 5 and may be realized in an indirectly-realized mode. In the electric power field, an indirect operation of a facility may be an operation of a physical facility by another person based on a direct relative transaction agreement or a transaction agreement via an exchange. In this case, an execution plan of the transaction agreement corresponds to an operation plan of the facility.

The information input/output terminal 4 is typically a computer such as a laptop personal computer or a smartphone and performs data input to the estimation calculation apparatus 2, the data management apparatus 3, and the plan management apparatus 5 and displays data stored by the apparatuses or displays data to be output. The data observation apparatus 6 regularly measures or collects sample estimation object data, sample factor data, and estimation factor data at predetermined time intervals and transmits the measured or collected data to the data distribution apparatus 7 or the data management apparatus 3. The data distribution apparatus 7 stores the data received from the data observation apparatus 6 and transmits the data to the data management apparatus 3, the estimation calculation apparatus 2, or both.

(1-2) Apparatus Internal Configuration

Figure 2:
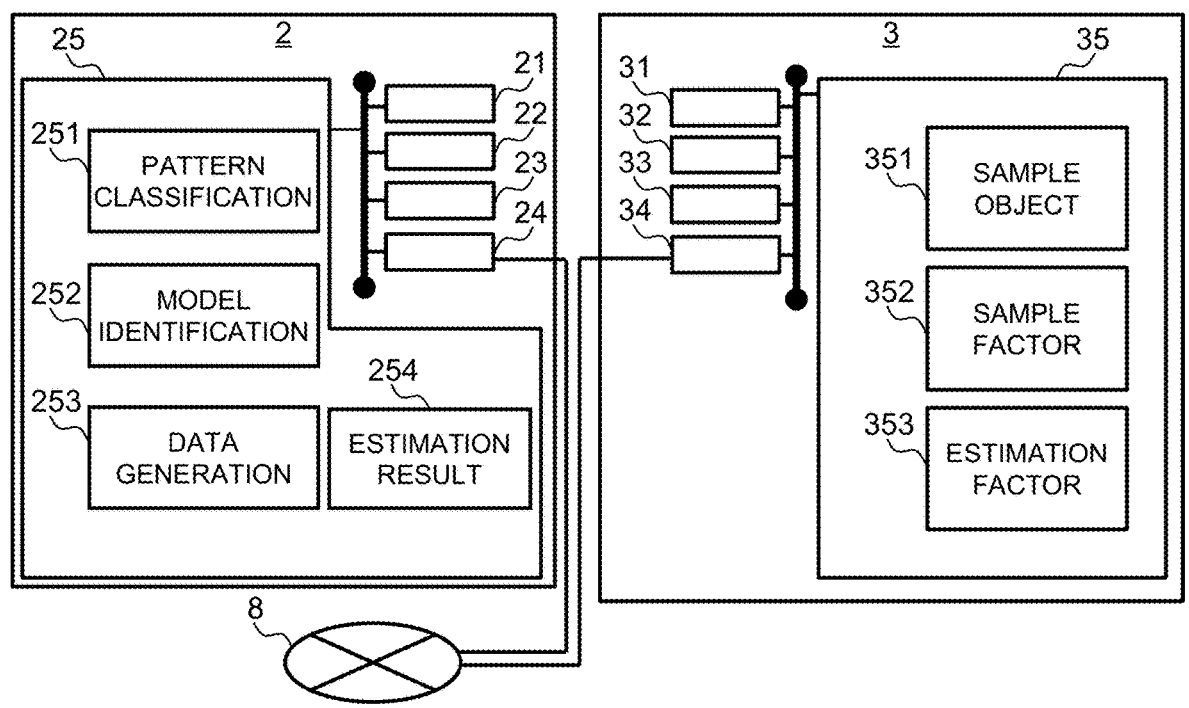
FIG. 2 is a diagram showing a configuration example of an estimation system.

FIG. 2 shows a configuration example of the estimation system 12.

The estimation system 12 is constituted of the estimation calculation apparatus 2 and the data management apparatus 3. Note that instead of a system equipped with a physical computer such as the estimation calculation apparatus 2 or the data management apparatus 3, the "estimation system" may be a system of another type such as a system (for example, a cloud computing system) realized on a group of physical calculation resources (for example, a cloud platform).

The data management apparatus 3 is constituted of a CPU (Central Processing Unit) 31 that comprehensively controls operations of the data management apparatus 3, an input apparatus 32, an output apparatus 33, a communication apparatus 34, and a storage apparatus 35. For example, the data management apparatus 3 is an information processing apparatus such as a personal computer, a server computer, or a handheld computer.

The input apparatus 32 is constituted of a keyboard or a mouse and the output apparatus 33 is constituted of a display or a printer.

The communication apparatus 34 is configured to include an NIC (Network Interface Card) for being coupled to a wireless LAN or a wired LAN. The communication apparatus 34 accepts data from, for example, at least one of the data observation apparatus 6 and the data distribution apparatus 7. The accepted data includes sample estimation object data 351 and sample factor data 352. The accepted data may further include estimation factor data 353.

The storage apparatus 35 is a storage medium such as a RAM (Random Access Memory) or a ROM (Read Only Memory). An output result or an interim result of each processing unit may be output via the output apparatus 33. The storage apparatus 35 stores the sample estimation object data 351, the sample factor data 352, and the estimation factor data 353.

The sample estimation object data 351 is data representing a value of a time series of an estimation object in a past period and, more specifically, for example, data including an observed value at one or a plurality of time points in the past of the estimation object. Specific examples of the estimation object are as described above.

The sample factor data 352 is data including, for each of one or more factors that affects a value of the estimation object, a data set representing a time series of the value of the factor in a past period (for example, an observed value or an estimate at one or a plurality of time points). Specific examples of the factors are as described above. In addition, the "observed value" or the "estimate" as used in this paragraph represents an example of a sample factor value. Hereinafter, an "observed value" or an "estimate" may be referred to as a "sample factor value" when appropriate. In addition, a "past period" related to the sample estimation object data 351 and a "past period" related to the sample factor data 352 may be the same period. For example, when the period related to the sample estimation object data 351 is from Jan. 1, 2020 to Dec. 31, 2020 and the period related to the sample factor data 352 is from May 1, 2020 to May 31, 2021, the "past period" as a same period may be from May 1, 2020 to Dec. 31, 2020 being an overlapping period.

The estimation factor data 353 is data including, for each of one or more factors described above, a data set representing a value of a time series of the factor in a future period and is, for example, data including an input value of each factor to be used in the calculation of an estimate of the estimation object. The "input value" as used in this paragraph represents an example of the estimation factor value. Hereinafter, an "input value" may be referred to as an "estimation factor value" when appropriate.

The estimation calculation apparatus 2 is constituted of a CPU (Central Processing Unit) 21 that comprehensively controls operations of the estimation calculation apparatus 2, an input apparatus 22, an output apparatus 23, a communication apparatus 24, and a storage apparatus 25. For example, the estimation calculation apparatus 2 is an information processing apparatus such as a personal computer, a server computer, or a handheld computer. At least one of the communication apparatuses 24 and 34 is an example of the "interface apparatus". At least one of the storage apparatuses 25 and 35 is an example of the "storage apparatus". At least one of the CPUs 21 and 31 is an example of the "processor".

The storage apparatus 25 stores various computer programs for realizing functions such as a pattern classifying unit 251, a pattern transformation model identifying unit 252, and an estimation data generating unit 253. The pattern classifying unit 251, the pattern transformation model identifying unit 252, and the estimation data generating unit 253 are realized as the CPU 21 executes the various computer programs.

The pattern classifying unit 251 accepts the sample estimation object data 351 as input, generates a plurality of transition patterns from the sample estimation object data 351 (classifies a time transition into transition patterns), and outputs the transition patterns. More specifically, for example, the pattern classifying unit 251 divides the sample estimation object data 351 into a plurality of time-series data samples of a predetermined period such as every 24 hours and generates a plurality of transformation patterns based on an index indicating a similarity between time-series data samples (classifies time-series data samples into any transition pattern among a plurality of transition patterns). The pattern classifying unit 251 outputs, for each transition pattern, data including a value indicating the transition pattern and a representative time-series data sample of the transition pattern (an example of the time-series data based on one or more time-series data samples) as pattern classification result data 251C (refer to FIG. 5).

The pattern transformation model identifying unit 252 accepts the pattern classification result data 251C and the sample factor data 352 as input and outputs a pattern transformation model 252D (refer to FIG. 6). For example, based on the sample factor data 352 and the pattern classification result data 251C, the pattern transformation model identifying unit 252 identifies a model of a transformation of a transition pattern as a pattern transformation model. More specifically, for example, the pattern transformation model identifying unit 252 identifies a model in accordance with a dependency relationship between a value (for example, a pattern number) indicating each transition pattern included in the pattern classification result data 251C and a value indicating a transformation pattern at a past (or future) time point and a factor value represented by the sample factor data 352 (a model which accepts a value of one or more factors and a transition pattern at a past time point as input and which produces a transition pattern as output), and outputs the model as the pattern transformation model 252D.

The estimation data generating unit 253 accepts the pattern transformation model 252D and the estimation factor data 353 as input and outputs estimation result data 254. More specifically, for example, the estimation data generating unit 253 generates time-series data of a value indicating a transition pattern by inputting the estimation factor data 353 to the pattern transformation model 252D. In addition, from a representative time-series data sample of each pattern included in the pattern classification result data 251C, the estimation data generating unit 253 converts time-series data of a value indicating the generated pattern into time-series data of a value of the estimation object. The estimation data generating unit 253 outputs the converted time-series data as the estimation result data 254.

According to the present embodiment, a value (value of an estimation object) can be estimated in units of a relatively short time (for example, 15 minutes or 30 minutes) over a relatively long future period (for example, a few months in the future).

Figure 3:
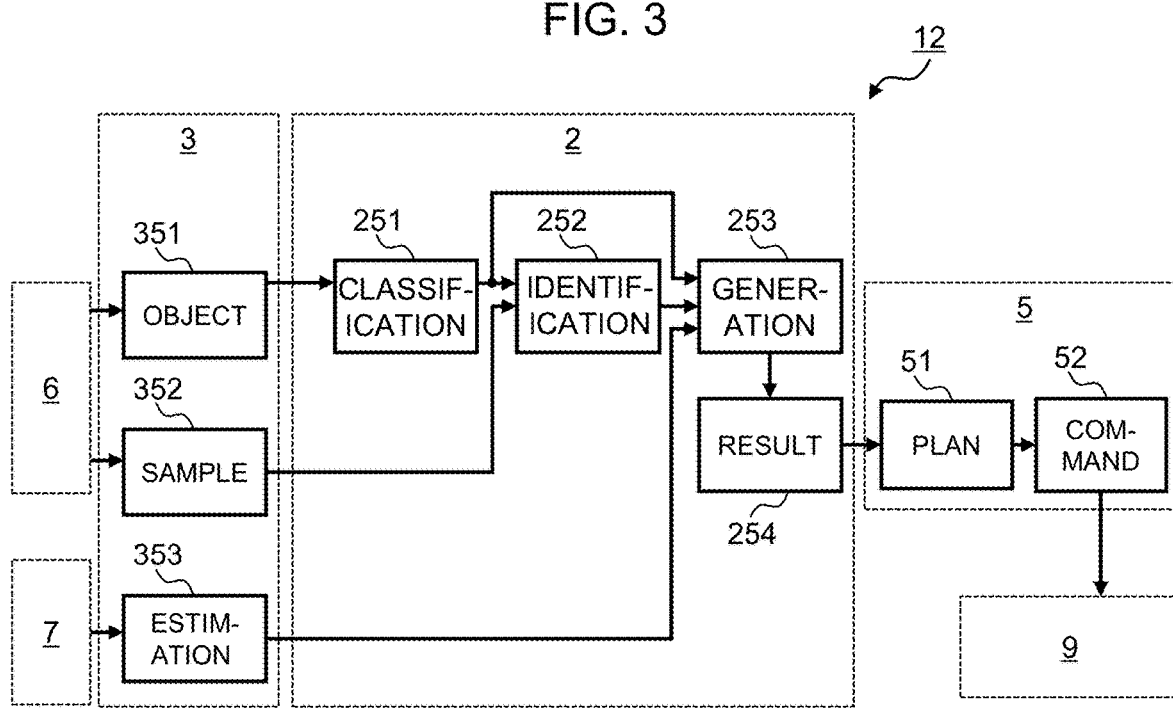
FIG. 3 is a diagram showing an example of a data flow of the estimation system.

(1-3) Processing and Data Flow of Entire Estimation System 12 According to the Present Embodiment Processing and data flow of the estimation system 12 according to the present embodiment will be described with reference to FIGS. 3 and 4. In the following description, the control object apparatus 9 is assumed to be a generator and the estimation system 12 is assumed to be a system for creating at least a part of an operation plan of the generator (for example, determining an amount of fuel to be procured as fuel of the generator that is an amount corresponding to a future period). In addition, in the following description, a period of transition represented by each of a plurality of transition patterns is assumed to be shorter than the future period described above and is assumed to be in an order of minutes, hours, days, or weeks. Furthermore, the estimation object is assumed to be a market price (transaction price) of electric power and the one or more factors is assumed to be at least one of weather and an electric power demand. In other words, the estimation system 12 according to the present embodiment is capable of estimating an electric power market price in units of a relatively short time (for example, 15 minutes or 30 minutes) over a relatively long future period (for example, a few months in the future).

For example, the data management apparatus 3 receives the sample estimation object data 351 and the sample factor data 352 from the data observation apparatus 6 and stores the received data. In addition, the data management apparatus 3 receives the estimation factor data 353 from the data distribution apparatus 7 and stores the received data.

Figure 4:
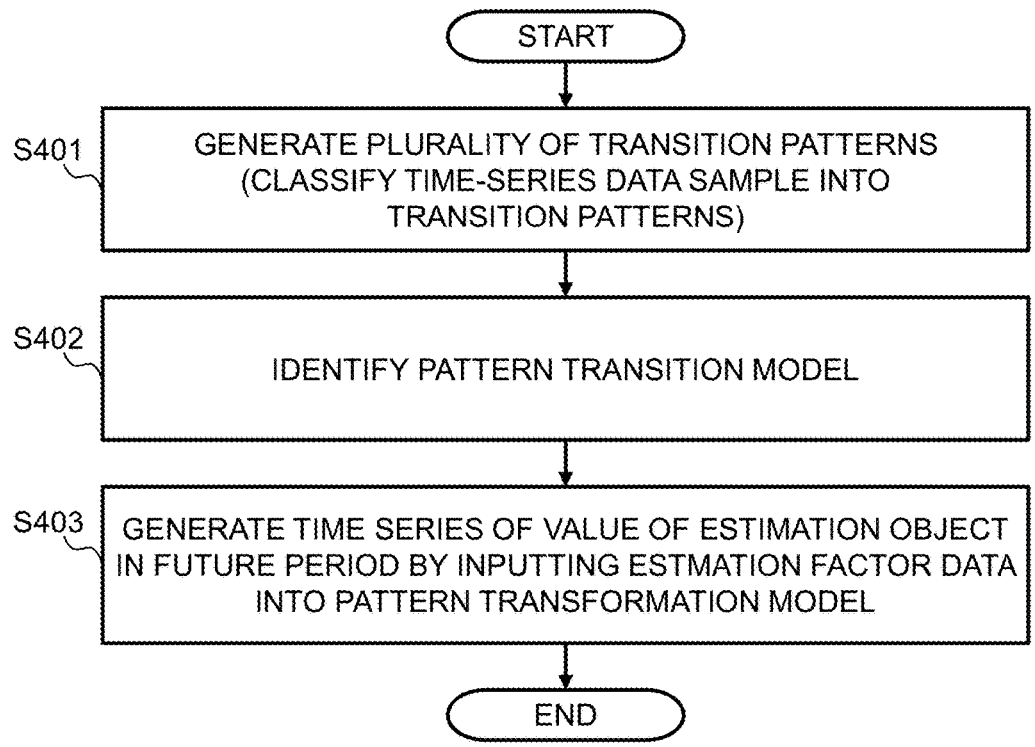
FIG. 4 is a diagram showing an example of a flow of processing performed by the estimation system.

The pattern classifying unit 251 of the estimation calculation apparatus 2 divides observed values (electric power market prices) of a time series being the sample estimation object data 351 into a plurality of time-series data samples of a predetermined period such as every 24 hours, classifies the time-series data samples into any transition pattern among a plurality of transition patterns based on an index indicating a similarity between the time-series data samples, and outputs pattern classification result data 251C (refer to FIG. 5) including a value indicating the transition pattern and a representative time-series data sample of the transition pattern (S401 in FIG. 4).

Next, the pattern transformation model identifying unit 252 identifies a model based on a regularity of a relationship between a value indicating a transition pattern of each time-series data sample included in the pattern classification result data 251C and a sample factor value represented by the sample factor data 352 and a regularity of a transformation over time of each transition pattern of the time-series data sample, and outputs the identified model as the pattern transformation model 252D (S402 in FIG. 4).

In addition, the estimation data generating unit 253 generates time-series data of the value indicating a pattern by inputting the estimation factor data 353 into the pattern transformation model 252D and converts a time series of a value indicating the generated pattern into a time series of a value of the estimation object from a representative time-series data sample of each pattern included in the pattern classification result data 251C. The estimation data generating unit 253 outputs data indicating a value of the converted time series as the estimation result data 254 (S403 in FIG. 4).

Subsequently, the estimation calculation apparatus 2 transmits the output estimation result data 254 to the plan management apparatus 5. In the plan management apparatus 5, a planning unit 51 determines, based on the estimation result data 254, an operation plan of the control object apparatus 9 (generator) (for example, an amount of fuel to be procured as fuel of the generator that is an amount corresponding to a future period and an operation plan of the procurement amount of fuel), transmits a command according to the determined plan to the control object apparatus 9, and displays the determined procurement amount of fuel on the information input/output terminal 4 (or the output apparatus 23 (for example, a display apparatus)).

The processing step described above concludes data estimation processing according to the present embodiment.

Hereinafter, a detailed embodiment of each component will be described with reference to FIGS. 5 to 7.

(1-4) Details of Each Component (1-4-1) Pattern Classifying Unit

Figure 5A:
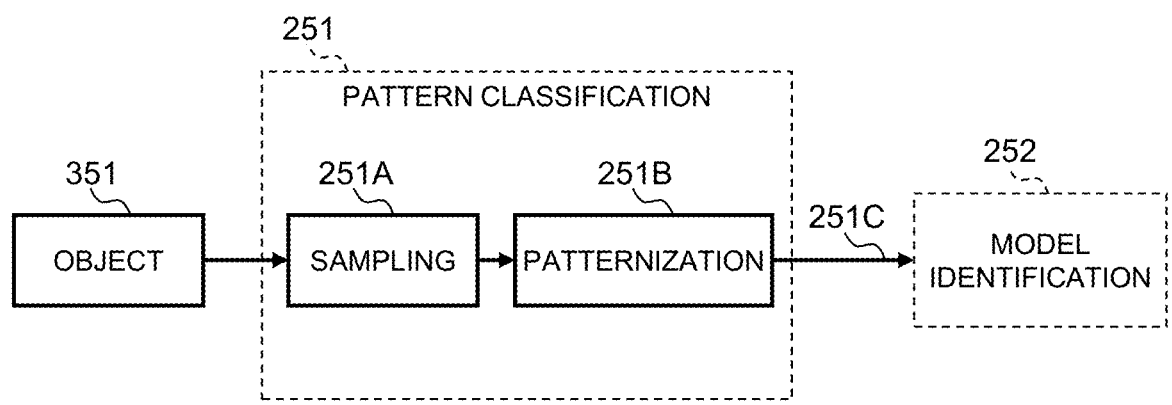
FIG. 5A is a diagram showing an example of a data flow of a pattern classifying unit.
Figure 5B:
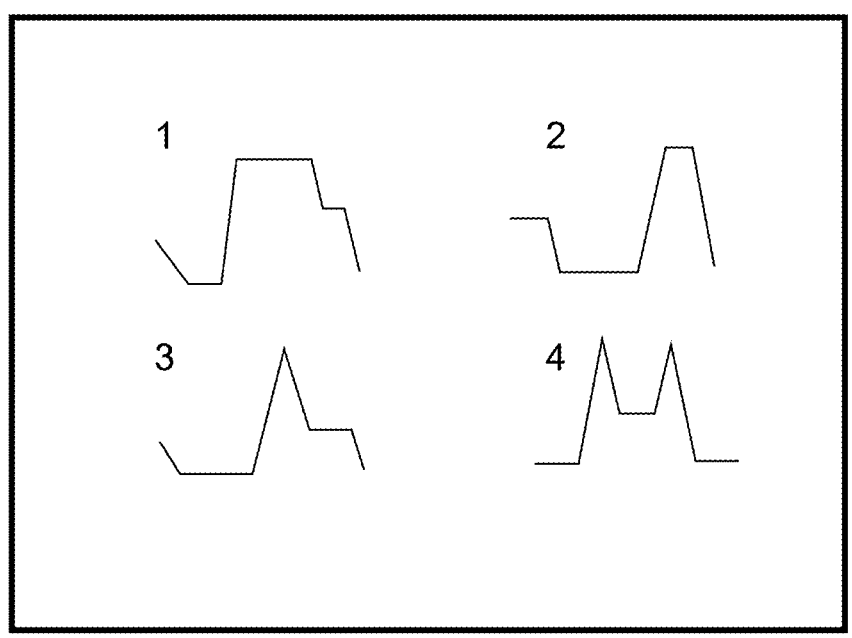
FIG. 5B is a diagram showing an example of a pattern.

A data flow and a processing operation of the pattern classifying unit 251 according to the present embodiment will be described with reference to FIGS. 5A and 5B.

The pattern classifying unit 251 according to the present embodiment classifies a time transition represented by the sample estimation object data 351 into any of transition patterns and outputs the classified time transition as pattern classifying unit data 353C. More specifically, for example, the pattern classifying unit 251 includes a sampling processing unit 251A and a patternization processing unit 251B.

The sampling processing unit 251A divides time-series data as the sample estimation object data 351 (data representing a time series of the electric power market price) into a plurality of time-series data samples (first estimation object samples) by dividing a period of time transition (past period) represented by the sample estimation object data 351 into a plurality of periods. Each of the plurality of periods may be, for example, a period such as a 24-hour period or a 1-week period. In addition, the plurality of periods may be constituted of periods of a same length or may be a mixture of different periods (for example, a given period may be 24 hours and another period may be 1 week). For the sake of simplicity, it is assumed in the present embodiment that the sample estimation object data 351 is divided into 24-hour units (day units).

Next, the patternization processing unit 251B classifies each first estimation object sample into any of a plurality of transition patterns based on an index indicating a similarity between the first estimation object samples and, for each of the first estimation object samples, specifies a number indicating a transition pattern being a classification destination of the estimation object sample (second estimation object sample). For example, the index indicating a similarity between the first estimation object samples may be a Euclidean distance between the samples or a Euclidean distance between frequency components, each of the frequency components having been converted by a frequency analysis from each of the first estimation object samples.

In addition, the patternization processing unit 251B outputs data including the first estimation object sample and the second estimation object sample as the pattern classification result data 251C. For example, the pattern classification result data 251C may include a time series of transition patterns (a sequence of numbers of transition patterns) and a representative time-series data sample (refer to FIG. 5B) for each transition pattern number.

This concludes the operation of the pattern classifying unit 251.

(1-4-2 Pattern Transformation Model Identifying Unit

Figure 6A:
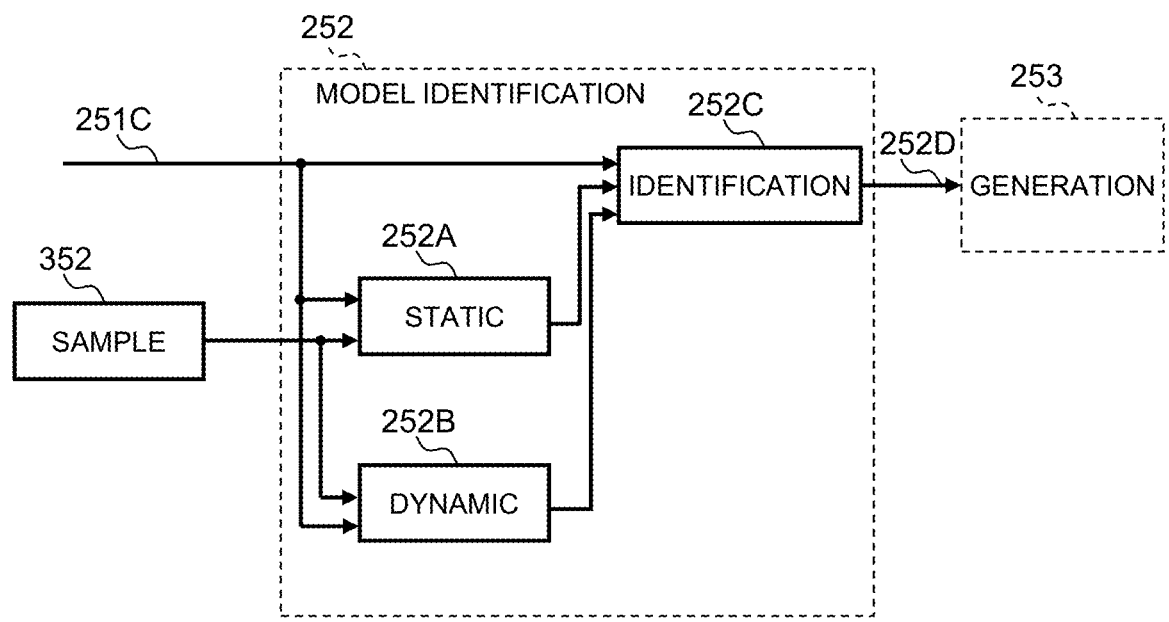
FIG. 6A is a diagram showing an example of a data flow of a pattern transformation model identifying unit.

A data flow and a processing operation of the pattern transformation model identifying unit 252 according to the present embodiment will be described with reference to FIGS. 6A and 6B.

The pattern transformation model identifying unit 252 according to the present embodiment identifies a pattern transformation model for calculating an estimate of an estimation object in a predetermined period using the sample factor data 352 and the pattern classification result data 251C and outputs the pattern transformation model 252D. More specifically, for example, the pattern transformation model identifying unit 252 includes a static explanatory variable generating unit 252A, a dynamic explanatory variable generating unit 252B, and a model identifying unit 252C.

The static explanatory variable generating unit 252A generates, using the sample factor data 352, a value of a static factor (a value of a static explanatory variable) with respect to each second estimation object sample (a value indicating a transition pattern of each time-series data sample) included in the pattern classification result data 251C. In a case where the estimation object is an electric power market price and a period unit of the second estimation object sample is a day unit, although the static factor (static explanatory variable) is, for example, at least one of air temperature and an electric power demand (an amount of electric power for which there is a demand) corresponding to each day of the second estimation object sample, the static factor (static explanatory variable) may further be an amount of power generation by photovoltaics, air volume section power generation, or the like, downtime information of a generator such as a thermal power generator, system information such as a transmission capacity of a system, a spot price or a futures price of fuel such as crude oil, information on demographics or industry dynamics of a region, calendar information, or the like, and a hourly value by the hour or a daily representative value such as an average value, a variance value, a maximum value or a minimum value of the factors may be adopted.

The dynamic explanatory variable generating unit 252B generates, using the sample factor data 352 and the pattern classification result data 251C, a value of a temporally antecedent or subsequent dynamic factor (a value of a dynamic explanatory variable) with respect to each second estimation object sample included in the pattern classification result data 251C. In a case where the estimation object is an electric power market price and a period unit of the second estimation object sample is a day unit, although the dynamic factor (dynamic explanatory variable) is, for example, at least one of air temperature and an electric power demand corresponding to a past day or a future day that predates or postdates each day of the second estimation object sample by a predetermined number of days, the dynamic factor (dynamic explanatory variable) may further be an amount of power generation by photovoltaics, air volume section power generation, or the like, downtime information of a generator such as a thermal power generator, system information such as a transmission capacity of a system, a spot price or a futures price of fuel such as crude oil, information on demographics or industry dynamics of a region, calendar information, the second estimation object sample itself, or the like, and a hourly value by the hour or a daily representative value such as an average value, a variance value, a maximum value or a minimum value of the factors may be adopted.

Figure 6B:
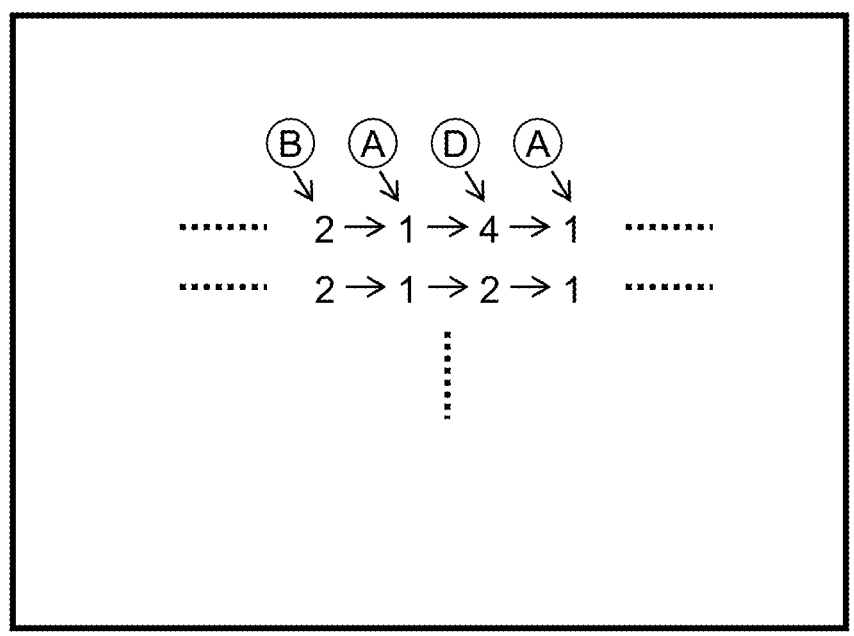
FIG. 6B is an explanatory diagram of an example of model identification.

The model identifying unit 252C specifies a regularity between the second estimation object sample and the value of the static factor and the value of the dynamic factor or, more specifically, for example, as shown in FIG. 6B, a dependency relationship among the number of a transition pattern, a value of one or more factors ("A", "B", and the like shown in FIG. 6B), and the number of a transition pattern at a past or future time point for each time point (each day). The model identifying unit 252C identifies a model which is based on the specified dependency relationship (regularity) and which accepts a value of one or more factors (for example, static factors) and a transition pattern at a past or future time point as input and which produces a transition pattern as output and outputs the model as the pattern transformation model 252D. According to the pattern transformation model 252D illustrated in FIG. 6B, if the input with respect to a given time point is a value of "1" indicating a transition pattern at a past time point (an immediately previous time point) and a value "D" of a factor at the given time point, the output with respect to the given time point is a value of "4" indicating a transition pattern. Note that the dependency relationship is not necessarily limited to one relationship and a plurality of relationships may be specified. More specifically, for example, there may be a case where, with respect to the given time point, a probability of the transition pattern with a value of "4" being output is 70% and a probability of the transition pattern with a value of "2" being output is 20%.

In addition, a known method may be applied to the identification of a model. The pattern transformation model 252D identified based on a known method may be a parametric linear model using a plurality of factors such as multiple regression analysis, a parametric non-linear model such as polynomial regression or logistic regression, or a non-parametric non-linear model using a decision tree or a neural network.

This concludes the operation of the pattern transformation model identifying unit 252.

(1-4-3) Estimation Data Generating Unit

Figure 7A:
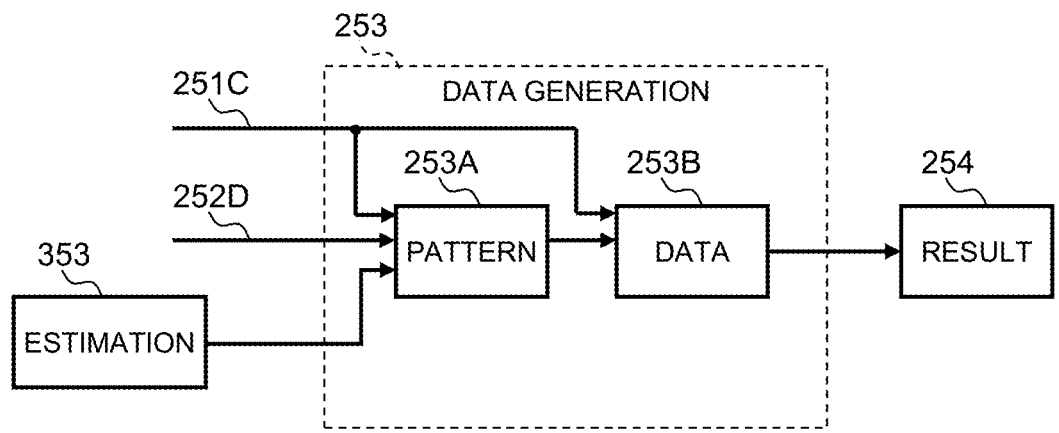
FIG. 7A is a diagram showing an example of a data flow of an estimation data generating unit.
Figure 7B:
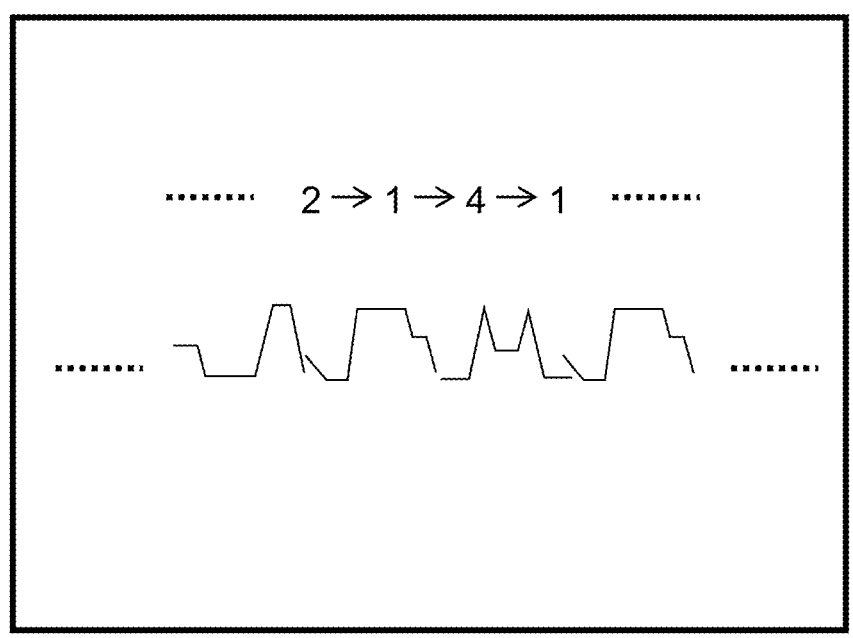
FIG. 7B is an explanatory diagram of an example of data generation.

A data flow and a processing operation of the estimation data generating unit 253 according to the present embodiment will be described with reference to FIGS. 7A and 7B.

The estimation data generating unit 253 according to the present embodiment uses the estimation factor data 353, the pattern transformation model 252D, and the pattern classification result data 251C to output one or more series of values over a predetermined period of an estimation object (data sets representing a time series of a value of the estimation object). More specifically, for example, the estimation data generating unit 253 includes a pattern transformation series generating unit 253A and a time-series data generating unit 253B.

By generating data at an initial time point (t1) in a predetermined period (for example, a future period) of each of factors (explanatory variables) that form a basis of the pattern transformation model 252D from a second estimation object sample (a value indicating a transition pattern) included in the estimation factor data 353 and the pattern classification result data 251C and inputting the data to the pattern transformation model 252D, the pattern transformation series generating unit 253A generates a value indicating the transition pattern (the number of the transition pattern) at the initial time point (t1) (for example, a given day) in the predetermined period. With respect to the initial time point (t1), the value indicating the transition pattern that is input to the pattern transformation model 252D may be a value of the transition pattern corresponding to a dynamic factor with respect to the initial time point (t1) (for example, when the dynamic factor used when identifying the pattern transformation model 252D includes a "value indicating a transition pattern of t−1", a value indicating a transition pattern of t−1 (≈0) with respect to the initial time point (t1) is input, and when the dynamic factor includes a "value indicating a transition pattern of t−2", a value indicating a transition pattern of t−2 (≈t(−1)) with respect to the initial time point (t1) is input. Next, by generating data at a next time point (t2) (for example, the day following the given day) in the predetermined period of each of factors (explanatory variables) from the estimation factor data 353 and the generated value (the value indicating a transition pattern) with respect to the initial time point (t1) described above and inputting the data (the value of the factor with respect to the next time point (t2) and the generated value with respect to the initial time point (t1)) to the pattern transformation model 252D, the pattern transformation series generating unit 253A generates a value indicating the transition pattern at the next time point (t2) in the predetermined period. Subsequently, same processing is to be repeated until an end time point (tn) in the predetermined period. Accordingly, a series of values indicating a transition pattern (with respect to each of t1, t2, . . . , tn) over the predetermined period is generated (refer to FIG. 7B).

Next, using each value (value indicating a transition pattern) of the series generated by the pattern transformation series generating unit 253A as a key, the time-series data generating unit 253B extracts a sample with a matching key from the second estimation object sample included in the pattern classification result data 251C. The time-series data generating unit 253B extracts a time-series data sample of the extracted sample from the first estimation object sample similarly included in the pattern classification result data 251C. The time-series data generating unit 253B generates representative time-series data of the transition pattern from the extracted time-series data sample. The representative time-series data may be, for example, an hourly average value, median value, or the like of the extracted time-series data sample. Finally, the time-series data generating unit 253B outputs the time-series data (time series of the representative time-series data) of the estimation object (refer to FIG. 7B) as the estimation result data 254 and stores the estimation result data 254 in the storage apparatus 25.

In the generation (generation of a value indicating a transition pattern) performed by the pattern transformation series generating unit 253A, there may be cases where values indicating a pattern cannot be narrowed down to one value. In such a case, the value indicating a transition pattern may be generated in plurality. In this case, values indicating a transition pattern at a next time point are respectively generated based on the generated values indicating respective transition patterns. For this reason, the output series of values indicating a transition pattern is also generated in plurality and, therefore, the data set (a data set representing a time series of values of the estimation object) included in the estimation result data 254 is also generated in plurality.

This concludes the operation of the estimation data generating unit 253.

(1-5) Description of Advantageous Effect of Present Embodiment

Next, an advantageous effect of the estimation system 12 according to the present embodiment will be described with reference to FIGS. 8A and 8B. Note that the present day is denoted as n and a period from an (n+1)th day to an (n+365)th day is exemplified as an estimation object period.

In addition, in the example, an electric power market price is assumed to be the estimation object.

Figure 8A:
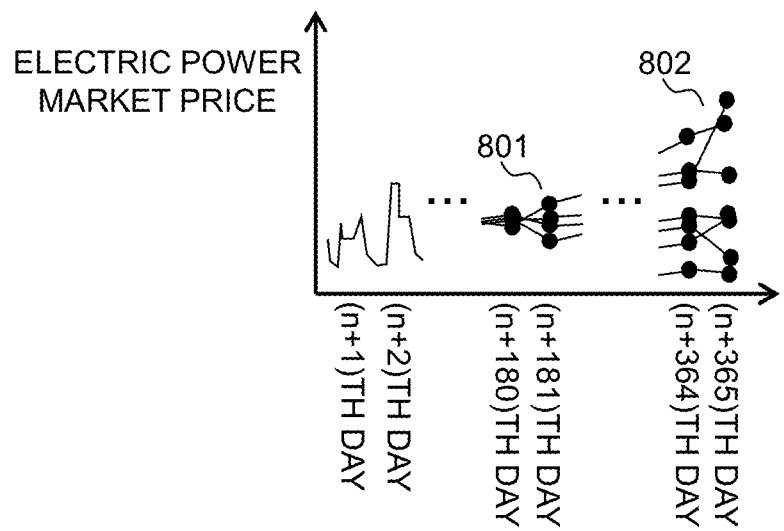
FIG. 8A is a diagram showing an example of time-series data generated by a method according to a comparative example.

FIG. 8A shows time-series data (data representing a time series of a value of an estimation object over a predetermined period) generated by a method according to a comparative example. In the comparative example, using a weather forecast value for each time of day enables nearest estimates of the (n+1)th day and the (n+2)th day (electric power market prices estimated based on days close to the present day) to be output relatively accurately and enables an estimate for each time of day to be output. However, since factor data that is usable near the (n+180)th day is limited to a weather forecast value and a fuel price value with large time granularity, as indicated by a reference numeral 801, a value of the estimation object to be output is also a value with large time granularity such as in day units. Furthermore, in a period later than the (n+365)th day, since factors such as a weather forecast value is a value based on a random number such as the Monte Carlo method, as indicated by a reference numeral 802, a range of a value of the estimation object increases.

Figure 8B:
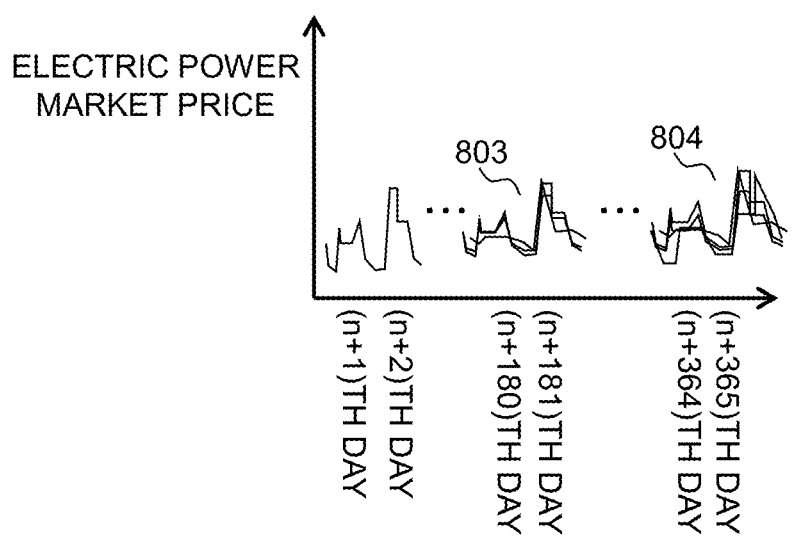
FIG. 8B is a diagram showing an example of time-series data generated by a method described in the embodiment.

On the other hand, FIG. 8B shows time-series data (data representing a time series of a value of an estimation object over a predetermined period) generated by a method described in the present embodiment. The method described in the present embodiment involves identifying a model which, for example, classifies a daily time-series value of the electric power market price (a time series of the electric power market price) into transition patterns and estimates a transformation of a pattern. Therefore, nearest estimates of the (n+1)th day and the (n+2)th day (electric power market price estimated based on days close to the present day) are relatively accurate in a similar manner to the comparative example and, as indicated by a reference numeral 803, an hourly estimate can be output even close to the (n+180)th day. In addition, since estimation based on regularity of a transformation of a transition pattern is performed, an estimate with fine time granularity can be obtained even in a period later than the (n+365)th day as indicated by a reference numeral 804 and, at the same time, upper and lower limit ranges of estimates can be more narrowly limited.

As described above, in the present embodiment, by reflecting a dependency relationship over time of the estimation object, generation of estimation result data with even higher accuracy in units of a short period of time over a predetermined period can be performed while matching the data with accurate forecast data up to a few days in the future. Furthermore, by using highly-accurate estimation result data in units of a short period of time as input when, for example, generating a plan for operation control of a generator, a deviation of the plan over a predetermined future period can be reduced, an amount of procured fuel can be normalized, and operation and economy of the generator can be stabilized.

Hereinafter, several further embodiments will be described. In the description of each embodiment given below, differences from the embodiment described above will be mainly described and descriptions of points in common with the embodiment described above will be either omitted or simplified.

(2) Second Embodiment

While the estimation data generating unit 253 according to the first embodiment outputs data including all data sets generated by the time-series data generating unit 253B as the estimation result data 254, in a second embodiment, the estimation data generating unit 253 extracts a data set of which a difference from an observed data set (for example, a time series of an observed value (for example, an electric power market price) acquired from the data observation apparatus 6) is equal to or smaller than a threshold among one or a plurality of data sets generated by the time-series data generating unit 253B and outputs data including the extracted data set as the estimation result data 254. The "threshold" may be a threshold determined based on a difference calculated with respect to each of the one or a plurality of data sets (for example, based on statistics of the differences) or a threshold determined in advance. The threshold may be zero (in other words, a difference may be absent).

Figure 9A:
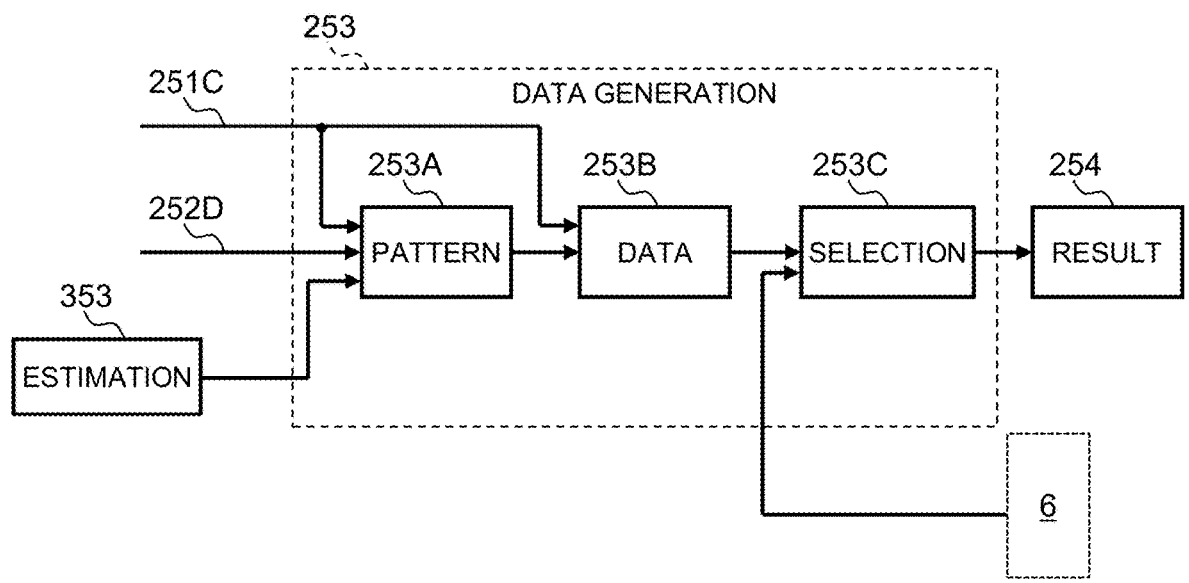
FIG. 9A is a diagram showing a data flow of an estimation data generating unit according to a second embodiment.
Figure 9B:
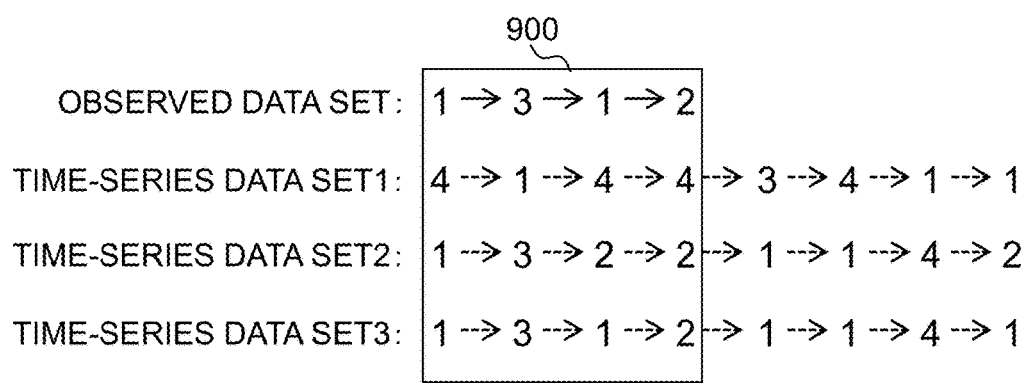
FIG. 9B is an explanatory diagram of an example of selection of a time-series data set.

A specific example will be described with reference to FIGS. 9A and 9B. The estimation data generating unit 253 further includes a time-series data selecting unit 253C.

The pattern transformation series generating unit 253A and the time-series data generating unit 253B generate one or a plurality of time-series data sets of an estimation object by processing similar to the processing described with reference to FIGS. 7A and 7B. Next, regarding each of the one or a plurality of time-series data sets generated by the time-series data generating unit 253B, the time-series data selecting unit 253C calculates a difference between an estimate at each time point in the time-series data set and an observed value at each time point in an observed data set (for example, at least a part of the sample estimation object data 351) with respect to a predetermined period 900. The time-series data selecting unit 253C outputs data including a data set of which the difference is equal to or smaller than the threshold as the estimation result data 254. More specifically, any one of the following may be adopted.

The predetermined period 900 is a past period. The observed data set is at least a part of the sample estimation object data 351. The estimation data generating unit 253 generates one or a plurality of time-series data sets with respect to a past period and a future period by inputting the sample factor data 352 in addition to the estimation factor data 353 to the pattern transformation model 252D. In addition, the time-series data selecting unit 253C compares a time series of an estimation object value in a past period in the sample estimation object data 351 with a time series of an estimate in a past period in each of the one or a plurality of time-series data sets. One or a plurality of time-series data sets of which the difference is equal to or smaller than the threshold are output.

The predetermined period 900 is a future period from the present to a relatively near future. The time-series data selecting unit 253C compares a time series of an observed value in the future period in an observed data set with a time series of an estimate in the future period in each of the one or a plurality of time-series data sets. One or a plurality of time-series data sets of which the difference is equal to or smaller than the threshold are output.

Accordingly, among the time-series data sets of the estimation object generated by the time-series data generating unit 253B, a data set with a high likelihood of actually occurring in a future period can be extracted and the estimation result data 254 with higher accuracy can be obtained. According to the example shown in FIG. 9B, an observed data set and a time-series data set generated by the estimation data generating unit 253 are both expressed by a time series of a value indicating a transition pattern for the sake of convenience. According to FIG. 9B, for example, data including time-series data sets 2 and 3 of which a difference from the observed data set is small is output as the estimation result data 254 with respect to the predetermined period 900.

(3) Third Embodiment

While the estimation data generating unit 253 according to the first embodiment outputs data including all data sets generated by the time-series data generating unit 253B as the estimation result data 254, in a third embodiment, the estimation data generating unit 253 set-extracts data of which a difference from a predicted data set including one or more predicted value generated by a separate predetermined method is equal to or smaller than a threshold among one or a plurality of data sets generated by the time-series data generating unit 253B and outputs data including the extracted data set as the estimation result data 254. The "threshold" may be a threshold determined based on a difference calculated with respect to each of the one or a plurality of data sets (for example, based on statistics of the differences) or a threshold determined in advance. The threshold may be zero (in other words, a difference may be absent).

Figure 10A:
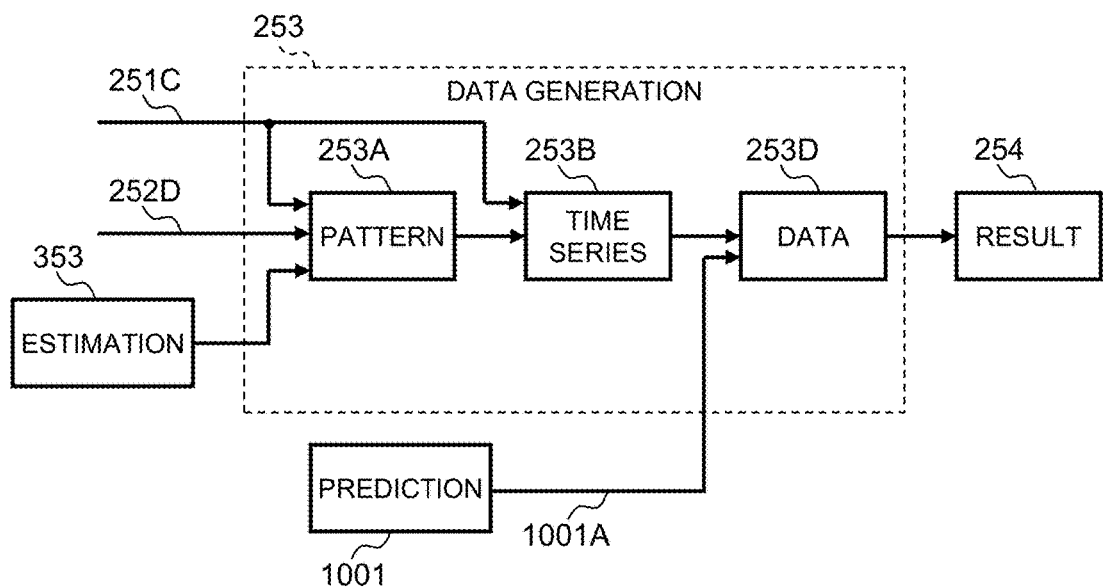
FIG. 10A is a diagram showing a data flow of an estimation data generating unit according to a third embodiment.
Figure 10B:
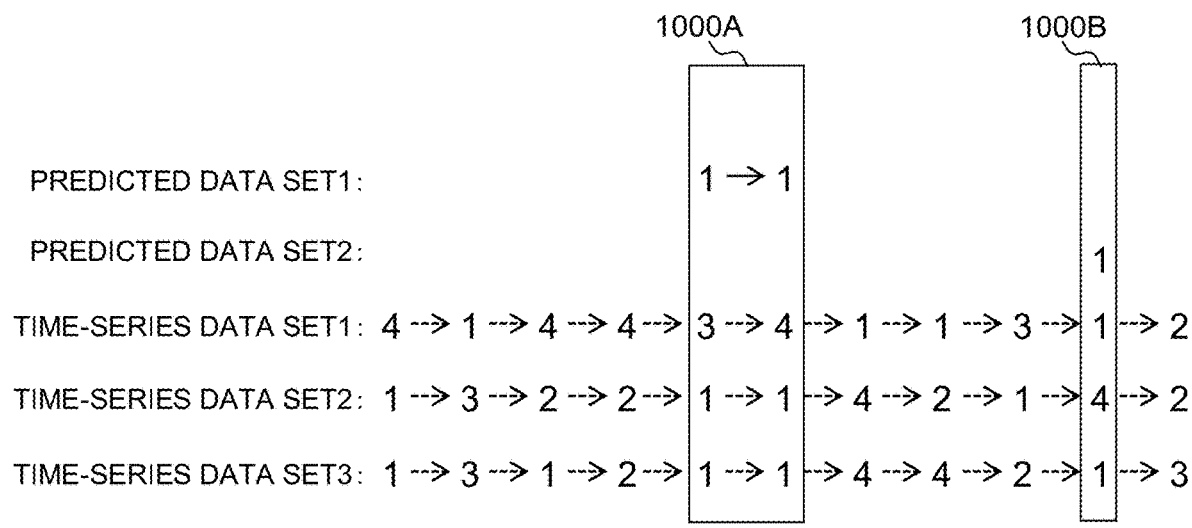
FIG. 10B is an explanatory diagram of an example of extraction of a time-series data set.

A specific example will be described with reference to FIGS. 10A and 10B.

The pattern transformation series generating unit 253A and the time-series data generating unit 253B generate one or a plurality of time-series data sets of an estimation object by processing similar to the processing described with reference to FIGS. 7A and 7B. Next, regarding each of the one or a plurality of time-series data sets generated by the time-series data generating unit 253B, the time-series data selecting unit 253C calculates a difference between a value with respect to a predetermined period 1000 in the time-series data set and a predicted data set (a time series of one or more predicted values) 1001A generated by a predicted value generating unit 1001 with respect to the predetermined period 1000, extracts a time-series data set of which the difference is equal to or smaller than a threshold, and outputs data including the extracted time-series data set as the estimation result data 254. Note that the predetermined period 1000A may be, for example, a future period that is relatively near to the present such as the next day or the day after the next and the predetermined period 1000B may be, for example, a future period that is relatively far from the present such as six months from the present.

In this case, the predicted value generating unit 1001 may be a function that is realized as the CPU 25 executes a program or a function in an apparatus that differs from the estimation calculation apparatus 2. A known method may be applied to the identification of a prediction model and the calculation of a predicted value in the predicted value generating unit 1001. Examples of the known method may include methods that assume linearity such as linear regression models including a multiple regression model and generalized linear models including logistic regression, methods that assume autoregressiveness such as an ARX (Auto Regressive with Exogenous) model, methods that use a shrinkage estimator such as Ridge regression, Lasso regression, and Elastic Net, methods that use a dimensional reducer such as a partial least-squares method and principal-component regression, and methods that are called non-parametric such as non-linear models using a polynomial, support vector regression, regression trees, Gaussian process regression, and a neural net.

Accordingly, among the time-series data sets of the estimation object generated by the time-series data generating unit 253B, a data set with a high likelihood of actually occurring in a future period can be extracted and the estimation result data 254 with higher accuracy can be obtained. According to the example shown in FIG. 10B, a predicted data set and a time-series data set generated by the estimation data generating unit 253 are both expressed by a time series of a value indicating a transition pattern for the sake of convenience. According to FIG. 10B, for example, data including time-series data set 3 of which a difference from predicted data sets 1 and 2 is absent is output as the estimation result data 254 with respect to the predetermined periods 1000A and 1000B.

(4) Fourth Embodiment

While the pattern transformation model identifying unit 252 according to the first to third embodiments does not change an identified pattern transformation model, in a fourth embodiment, the pattern transformation model identifying unit 252 adjusts a pattern transformation model so as to conform to a predicted value output by the predicted value generating unit 1001.

Figure 11:
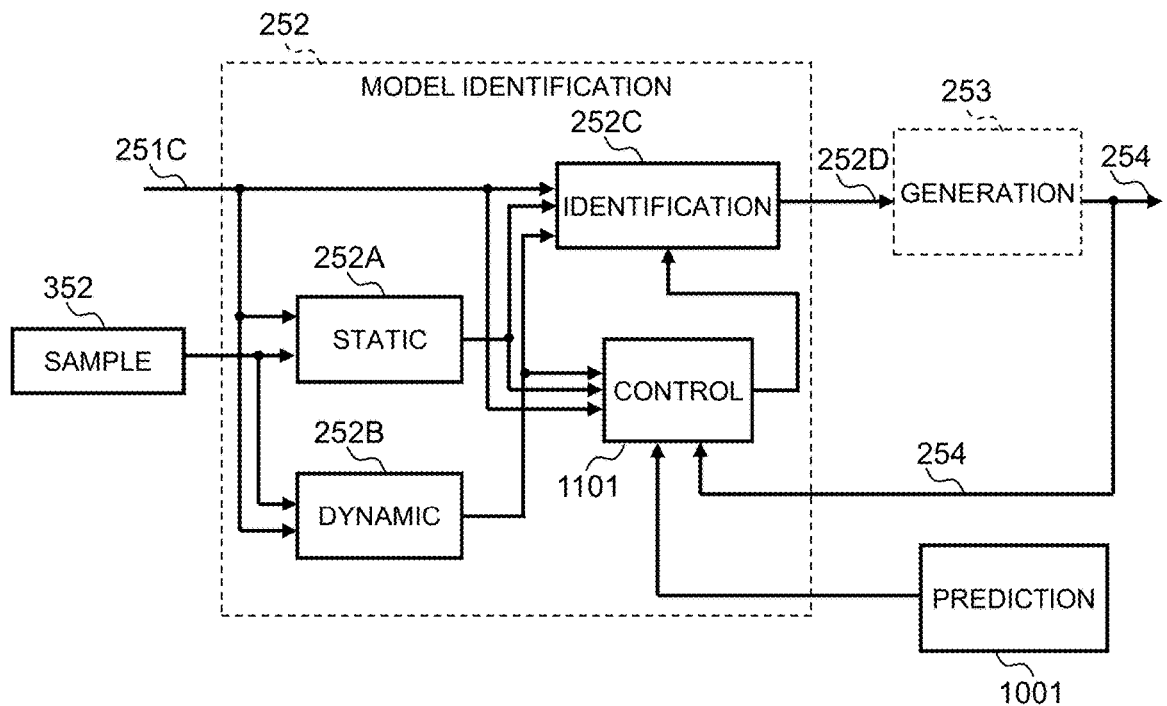
FIG. 11 is a diagram showing a data flow of a pattern transformation model identifying unit according to a fourth embodiment.

More specifically, a description will be given with reference to, for example, FIG. 11. The pattern transformation model identifying unit 252 further includes a model control unit 1101.

The static explanatory variable generating unit 252A, the dynamic explanatory variable generating unit 252B, and the model identifying unit 252C output the pattern transformation model 252D by same processing as the processing described with reference to FIGS. 6A and 6B. In addition, the estimation result data 254 as time-series data of an estimation object over a predetermined period is generated in the estimation data generating unit 253.

Subsequently, the model control unit 1101 in the pattern transformation model identifying unit 252 acquires the estimation result data 254 described above and a predicted data set output by the predicted value generating unit 1001. In addition, the model control unit 1101 changes the pattern transformation model 252D so that a difference between the predicted data set output by the predicted value generating unit 1001 and data in a same period of the estimation result data 254 is reduced (for example, minimized). In this case, for example, "change" may be processing of selecting an explanatory variable to be used in the pattern transformation model 252D. More specifically, for example, the model control unit 1101 may identify a pattern transformation model for each combination of used explanatory variables, calculate a difference between estimation result data generated by each pattern transformation model and the predicted data set, and extract the combination of explanatory variables used in the pattern transformation model with the smallest difference. Furthermore, the model control unit 1101 may input the extracted combination of explanatory variables to the model identifying unit 252C and the model identifying unit 252C may once again identify a pattern transformation model using the input combination of explanatory variables and output the identified pattern transformation model.

Accordingly, among a time-series data set of the estimation object generated by the time-series data generating unit 253B, a probability of extracting data with a high likelihood of actually occurring in a future period can be increased and the estimation result data 254 with higher accuracy can be obtained.

While the model control unit 1101 in the description given above is described as performing processing based solely on a difference from the predicted data set, in place thereof or in addition thereto, the model control unit 1101 may change the pattern transformation model based on a difference between the predicted data set and a first estimation object sample included in the pattern classification result data 251C. Accordingly, overconformity to a predicted result output by the predicted value generating unit 1001 can be prevented and the estimation result data 254 with higher accuracy can be obtained.

(5) Fifth Embodiment

While the pattern classifying unit 251 according to the first to fourth embodiments only classifies the sample estimation object data 351 into patterns, in a fifth embodiment, factor data may also be classified.

Figure 12:
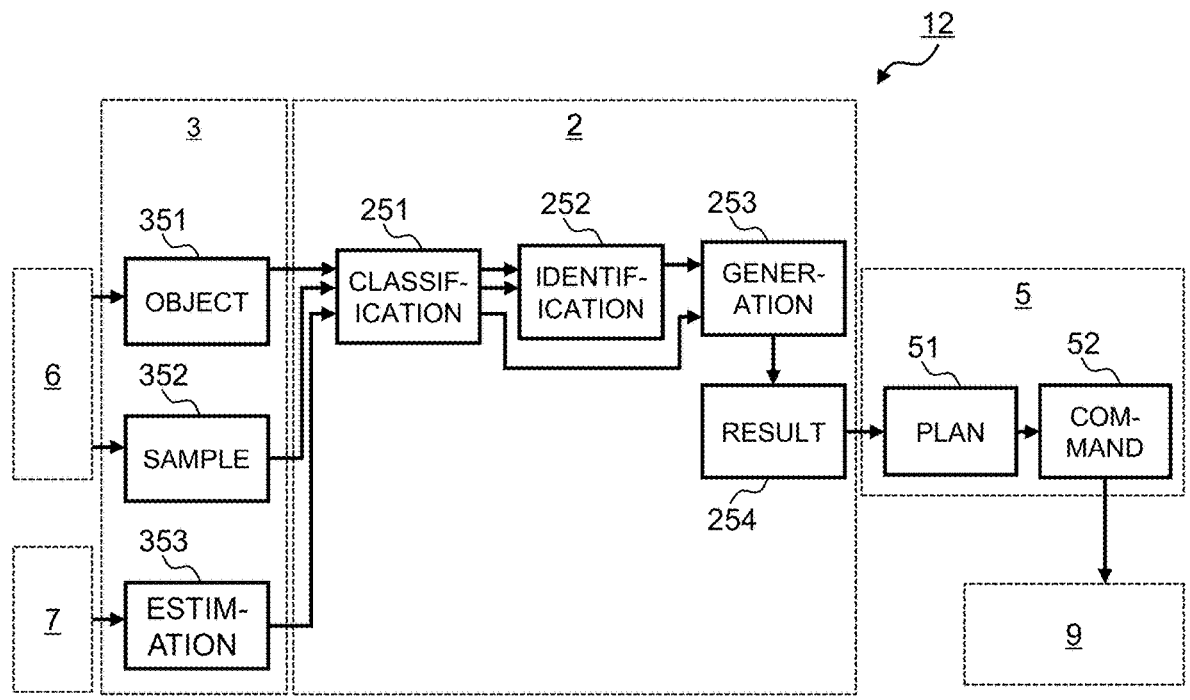
FIG. 12 is a diagram showing a data flow of an estimation system according to a fifth embodiment.

More specifically, a description will be given with reference to, for example, FIG. 12. The pattern classifying unit 251 respectively classifies the sample estimation object data 351, the sample factor data 352, and the estimation factor data 353 into patterns by the processing described with reference to FIGS. 5A and 5B and outputs the classified patterns as the pattern classification result data 251C. In addition, the pattern transformation model identifying unit 252 outputs the pattern transformation model 252D using values (second estimation object and factor sample) indicating a pattern of an estimation object for a sample and a factor included in the pattern classification result data 251C. Furthermore, the estimation data generating unit 253 calculates a series of values indicating a pattern of the estimation object over a predetermined period in the future by inputting a value indicating a pattern of an estimation factor included in the pattern classification result data 251C to the pattern transformation model 252D and outputs time-series data of the value of the estimation object.

Accordingly, a time-series array of each factor can be contracted to a value indicating a pattern, an information amount of a pattern transformation model can be reduced, and a calculation load can be decreased. In addition, contracting the time-series array of each factor to a value indicating a pattern is to reduce the number of explanatory variables which also enables insufficient convergence of an identification calculation of a pattern transformation model due to an excessive number of explanatory variables to be avoided.

In the present embodiment, for example, the following is possible.

Data accepted by the communication apparatus 24 may include data including sample element data. The storage apparatus 25 may store sample element data and estimation element data. The sample element data may be data including, for each of one or more elements defined to be potentially capable of affecting a value of at least one factor, a data set representing a value of a time series of the element in the past period. The estimation element data may be data including, for each of one or more elements, a data set representing a value of a time series of the element in a future period. In other words, "element" as used in this paragraph may be a factor defined to affect a value of the factor (the factor defined to be potentially capable of affecting a value of the estimation object) described above.

The pattern classifying unit 251 may generate, with respect to at least one factor among one or more factors, a plurality of factor transition patterns, each of which being a pattern of a transition of a factor value, from a data set in sample factor data. Based on the sample element data and the plurality of factor transition patterns, the pattern transformation model identifying unit 252 may specify a factor element dependency relationship that is a dependency relationship between a factor transition pattern and a value of one or more elements and a factor transition pattern at a past or future time point. The pattern transformation model identifying unit 252 may identify a factor model in accordance with the factor element dependency relationship and which is a model that accepts the value of one or more elements and the past or future factor transition pattern as input and which produces a factor transition pattern as output as the pattern transformation model 252D. By inputting estimation element data to the pattern transformation model 252D as a factor model, the estimation data generating unit 253 may output estimation factor data that is data including one or more data sets representing a time series of a value in a future period of the at least one factor using at least one of the plurality of factor transition patterns. Accordingly, for example, the following processing is possible. By adopting weather as a factor as an estimation object, a pattern transformation model is generated with respect to weather. Using the pattern transformation model, estimation element data that is data representing a time series of estimates of weather is output as estimation result data. Next, by adopting an electric power demand as a factor as an estimation object and adopting weather as an element as a factor, a pattern transformation model is generated with respect to the electric power demand. By inputting estimation element data that is data representing a time series of estimates of weather to the pattern transformation model, estimation factor data that is data representing a time series of estimates of the electric power demand is output as estimation result data. By inputting the estimation factor data to the pattern transformation model of the electric power market price, an estimation result data representing a time series of estimates of the electric power market price is output.

While several embodiments of the present invention has been described above, the embodiments are merely examples for describing the present invention and are not intended to limit the scope of the present invention to the embodiments. The present invention can also be implemented in various other modes. For example, any two or more embodiments among the plurality of embodiments described above may be combined with each other.

REFERENCE SIGNS LIST

1 Data management system
2 Estimation calculation apparatus
3 Data management apparatus
4 Information input/output terminal
5 Plan management apparatus
6 Data observation apparatus
7 Data distribution apparatus
8 Communication path
9 Control object apparatus
12 Estimation system

The invention claimed is:

1. An estimation system, comprising:
a first computer including a first network interface and a storage device, the storage device storing sample estimation object data, sample factor data, and estimation factor data, the sample estimation data being time series data of electric power consumption, and the sample factor data being time series data of weather values which affect the time series data of electric power consumption, the estimation factor data including, for each of the one or more factors, a data set representing a value of a time series of the factor in a future period;
a second computer including a second network interface coupled to the first network interface via a network; and
an electric power generator that consumes fuel,
wherein the second computer is programmed to:
generate, from the sample estimation object data, a plurality of estimation object transition patterns, each of which being a pattern of a transition of a value of the estimation object,
specify a pattern factor dependency relationship which is a dependency relationship between (X) and (Y) based on the sample factor data and the plurality of estimation object transition patterns, (X) being an estimation object transition pattern, and (Y) being a value of the one or more factors and an estimation object transition pattern at a past or future time point,
identify an estimation model which is a model in accordance with the pattern factor dependency relationship and which is a model that accepts the value of the one or more factors and the estimation object transition pattern at a past or future time point as input and which produces an estimation object transition pattern as output, and
generate, by inputting the estimation factor data to the estimation model, estimation result data which is data including one or more data sets representing a time series of a value in the future period of the estimation object using at least one of the plurality of estimation object transition patterns,
determine, based on the estimation result data, an amount of fuel for the generator which corresponds to the future period, as part of an operation plan of the generator, and
transmit a command to control the generator based on the operation plan to operate the generator,
wherein a period of transition represented by each of the plurality of estimation object transition patterns is shorter than the future period and is a time period of minutes, hours, days, or weeks.

2. The estimation system according to claim 1, wherein the second computer is programmed to generate, by inputting at least the estimation factor data among the sample factor data and the estimation factor data to the estimation model, estimation result data which is data including one or more data sets representing a time series of a value in a predetermined period including the future period of the estimation object, and
wherein the one or more data sets included in the estimation result data is a data set of which a difference from a time series of an observed value with respect to an estimation object is equal to or smaller than a threshold among one or a plurality of data sets generated by the processor using the estimation model.

3. The estimation system according to claim 1, wherein with respect to each of the one or more data sets included in the estimation result data, a difference between a value in the data set and a predicted data set including one or more values predicted by a predetermined method regarding a part of time points in the future period is equal to or smaller than a threshold.

4. The estimation system according to claim 1, wherein when at least one data set in the estimation result data has a first difference that is a difference between a value in the data set and a value predicted by a predetermined method with respect to at least a part of time points in the future period, the processor performs a change for reducing the first difference as a change to the identified estimation model.

5. The estimation system according to claim 4,
wherein when at least one data set in the estimation result data has a second difference that is a difference between a value in the data set and a value specified from the sample estimation object data instead of or in addition to the first difference with respect to at least a part of time points in the future period, a change for reducing the second difference instead of or in addition to the first difference as a change to the identified estimation model is performed.

6. The estimation system according to claim 1,
wherein the storage device stores sample element data and estimation element data,
wherein the sample element data is data including, for each of one or more elements defined to be potentially capable of affecting a value of the at least one factor, a data set representing a value of a time series of the element in the past period,
wherein the estimation element data is data including, for each of the one or more elements, a data set representing a value of a time series of the element in the future period,
wherein the second computer is programmed to:
generate, with respect to at least one factor among the one or more factors, a plurality of factor transition patterns, each of which being a pattern of a transition of a factor value, from a data set in the sample factor data,
specify a factor element dependency relationship which is a dependency relationship between (x) and (y) based on the sample element data and the plurality of factor transition patterns, (x) being a factor transition pattern, and (y) being a value of the one or more elements and a factor transition pattern at a past or future time point,
identify a factor model which is a model in accordance with the factor element dependency relationship and which is a model that accepts the value of the one or more elements and the factor transition pattern in the past or the future as input and which produces a factor transition pattern as output, and
output, by inputting the estimation element data to the factor model, the estimation factor data that is data including one or more data sets representing a time series of a value in the future period of the at least one factor using at least one of the plurality of factor transition patterns.

7. An estimation method of an estimation system, the estimation system including a first computer including a first network interface and a storage device, the storage device storing sample estimation object data, sample factor data, and estimation factor data, the sample estimation data being time series data of electric power consumption, and the sample factor data being time series data of weather values which affect the time series data of electric power consumption, the estimation factor data including, for each of the one or more factors, a data set representing a value of a time series of the factor in a future period; a second computer including a second network interface coupled to the first network interface via a network; and an electric power generator that consumes fuel, the method comprising:
generating, from sample estimation object data that is data representing a value of a time series of an estimation object in a past period, a plurality of estimation object transition patterns, each of which being a pattern of a transition of a value of the estimation object;
specifying a pattern factor dependency relationship which is a dependency relationship between (X) and (Y) based on sample factor data and the plurality of estimation object transition patterns, the sample factor data being data including, for each of one or more factors defined to be potentially capable of affecting a value of the estimation object, a data set representing a value of a time series of the factor in the past period, (X) being an estimation object transition pattern, and (Y) being a value of the one or more factors and an estimation object transition pattern at a past or future time point;
identifying an estimation model which is a model in accordance with the pattern factor dependency relationship and which is a model that accepts the value of the one or more factors and the estimation object transition pattern at a past or future time point as input and which produces an estimation object transition pattern as output;
generating, by inputting estimation factor data being data including a data set representing a value of a time series of the factor in a future period with respect to each of the one or more factors to the estimation model, estimation result data being data including one or more data sets representing a time series of a value in the future period of the estimation object using at least one of the plurality of estimation object transition patterns;
determining, based on the estimation result data, an amount of fuel for the generator which corresponds to the future period, as part of an operation plan of the generator; and
transmitting a command to control the generator based on the operation plan to operate the generator,
wherein a period of transition represented by each of the plurality of estimation object transition patterns is shorter than the future period and is a time period of minutes, hours, days, or weeks.

* * * * *